(No Model.)

W. NICOLAY.
CORD OR ROPE FASTENER.

No. 339,008. Patented Mar. 30, 1886.

WITNESSES:
A Faber du Faur Jr
Otto Hufeland

INVENTOR
Wendel Nicolay.
BY
Van Santvoord & Hauff
his ATTORNEYS

UNITED STATES PATENT OFFICE.

WENDEL NICOLAY, OF JERSEY CITY, NEW JERSEY.

CORD OR ROPE FASTENER.

SPECIFICATION forming part of Letters Patent No. 339,008, dated March 30, 1886.

Application filed May 22, 1885. Serial No. 166,966. (No model.)

*To all whom it may concern:*

Be it known that I, WENDEL NICOLAY, a citizen of the German Empire, residing at Jersey City, in the county of Hudson and State of New Jersey, have invented new and useful Improvements in Cord or Rope Fasteners, of which the following is a specification.

My invention consists in a rope or cord fastener formed of one piece, having at one end a ring or hole, a yoke at its other end, and a spur which extends upward from one arm of the yoke and forms a crotch with the shank of the fastener.

Figure 2:
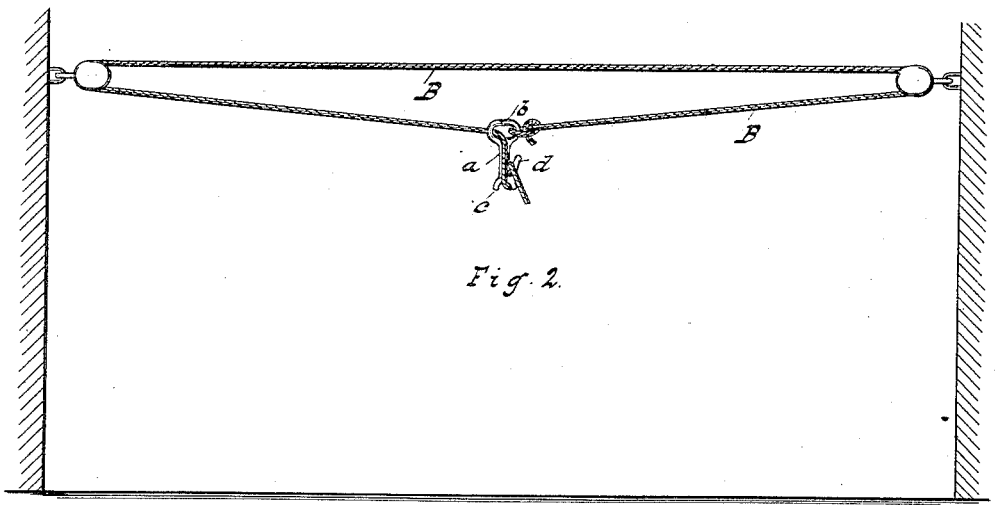
Figure 1:
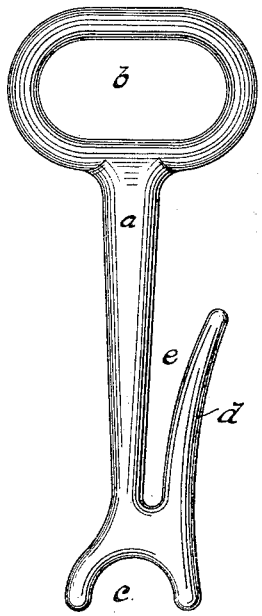

In the accompanying drawings, Figure 1 is a face view of my improved rope or cord fastener. Fig. 2 shows the same applied to a clothes-line.

Similar letters indicate corresponding parts.

The rope or cord fastener which is preferably made of metal is provided on one end of its shank $a$ with a ring or hole, $b$, to which one end of the clothes line or rope B, Fig. 2, is secured. On the other end of the shank $a$ is formed a yoke, $c$, from one arm of which extends a spur, $d$, which projects upward and forms a crotch, $e$, with the shank.

To secure a rope by means of this fastener one end of the rope is secured to one side of the ring $b$, as before stated, and the other end of the rope is passed through the ring down one side of the shank, then between the arms of the yoke $c$ and through the crotch, in which it is fastened by drawing the free end downward so as to firmly wedge the rope between the spur and the shank.

The fastener admits of the cord or rope being fastened with rapidity and ease, it only being necessary to slip the latter through the ring around the yoke and through the crotch, while by simply withdrawing or raising the cord or rope out of the crotch the same is unfastened.

What I claim as new, and desire to secure by Letters Patent, is—

A rope or cord fastener formed of one piece having at one end a ring or hole, a yoke at its other end, and a spur extending upward from one arm of the yoke toward the ring or hole and forming a tapering crotch with the shank of the fastener, substantially as shown and described.

In testimony whereof I have hereunto set my hand and seal in the presence of two subscribing witnesses.

WENDEL NICOLAY. [L. S.]

Witnesses:
    W. HAUFF,
    E. F. KASTENHUBER.